(12) United States Patent
Jing et al.

(10) Patent No.: US 7,847,035 B2
(45) Date of Patent: *Dec. 7, 2010

(54) POLYMER ELECTROLYTE WITH AROMATIC SULFONE CROSSLINKING

(75) Inventors: Naiyong Jing, Woodbury, MN (US); Michael A. Yandrasits, Hastings, MN (US); Steven J. Hamrock, Stillwater, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 978 days.

This patent is subject to a terminal disclaimer.

(21) Appl. No.: 11/278,459

(22) Filed: Apr. 3, 2006

(65) Prior Publication Data

US 2006/0160958 A1   Jul. 20, 2006

Related U.S. Application Data

(62) Division of application No. 10/720,906, filed on Nov. 24, 2003, now Pat. No. 7,060,756.

(51) Int. Cl.
    *C08G 75/00* (2006.01)

(52) U.S. Cl. .................. 525/535; 525/327.4; 525/331.6; 522/151; 522/155; 522/162

(58) Field of Classification Search .................. 525/535, 525/327.4, 331.6; 522/151, 155, 162
See application file for complete search history.

(56) References Cited

U.S. PATENT DOCUMENTS

| | | | |
|---|---|---|---|
| 3,282,875 A | 11/1966 | Connolly et al. | |
| 3,635,926 A | 1/1972 | Gresham et al. | |
| 3,784,399 A | 1/1974 | Grot | |
| 3,853,828 A | 12/1974 | Wall et al. | |
| 4,000,356 A | 12/1976 | Weisgerber et al. | |
| 4,073,752 A | 2/1978 | Ramp | |
| 4,169,023 A | 9/1979 | Sata et al. | |
| 4,214,060 A | 7/1980 | Apotheker et al. | |
| 4,218,542 A | 8/1980 | Ukihashi et al. | |
| 4,230,549 A | 10/1980 | D'Agostino et al. | |
| 4,242,498 A | 12/1980 | Rosser et al. | |
| 4,268,650 A | 5/1981 | Rose | |
| 4,281,092 A | 7/1981 | Breazeale | |
| 4,330,654 A | 5/1982 | Ezzell et al. | |
| 4,334,082 A | 6/1982 | Resnick | |
| 4,391,844 A | 7/1983 | Baczek et al. | |
| 4,414,159 A | 11/1983 | Resnick | |
| 4,440,917 A | 4/1984 | Resnick | |
| 4,454,247 A | 6/1984 | Resnick | |
| 4,470,889 A | 9/1984 | Ezzell et al. | |
| 4,508,603 A | 4/1985 | Ukihashi et al. | |
| 4,602,045 A | 7/1986 | Markus et al. | |
| 4,686,024 A | 8/1987 | Scherer, Jr. et al. | |
| 4,734,474 A | 3/1988 | Hamada et al. | |
| 4,743,419 A | 5/1988 | Bierschenk | |
| 4,755,567 A | 7/1988 | Bierschenk et al. | |
| 4,981,932 A | 1/1991 | Blaise et al. | |
| 5,260,351 A | 11/1993 | Logothetis | |
| 5,264,093 A | 11/1993 | Banerjee | |
| 5,264,508 A | 11/1993 | Ishibe et al. | |
| 5,330,626 A | 7/1994 | Banerjee | |
| 5,466,930 A | 11/1995 | Schlenoff | |
| 5,527,861 A | 6/1996 | Logothetis | |
| 5,608,022 A | 3/1997 | Nakayama et al. | |
| 5,693,748 A | 12/1997 | Ikeda et al. | |
| 5,795,496 A | 8/1998 | Yen et al. | |
| 5,798,417 A | 8/1998 | Howard, Jr. | |
| 5,804,650 A | 9/1998 | Tsuda et al. | |
| 5,852,148 A | 12/1998 | Behr et al. | |
| 5,986,012 A | 11/1999 | Legare et al. | |
| 6,011,074 A | 1/2000 | Sorenson et al. | |
| 6,090,895 A * | 7/2000 | Mao et al. ................. | 525/330.9 |
| 6,224,994 B1 | 5/2001 | Asukabe et al. | |
| 6,225,368 B1 | 5/2001 | D'Agostino et al. | |
| 6,242,123 B1 | 6/2001 | Nezu et al. | |
| 6,248,469 B1 | 6/2001 | Formato et al. | |
| 6,254,978 B1 | 7/2001 | Bahar et al. | |
| 6,255,370 B1 | 7/2001 | Vizcaino et al. | |
| RE37,307 E | 8/2001 | Bahar et al. | |
| 6,274,677 B1 | 8/2001 | Tatemoto | |
| 6,277,512 B1 | 8/2001 | Hamrock et al. | |
| 6,355,370 B2 | 3/2002 | Katoh et al. | |
| RE37,656 E | 4/2002 | Bahar et al. | |
| 6,365,769 B1 | 4/2002 | Behr et al. | |
| 6,380,337 B2 | 4/2002 | Abe et al. | |
| RE37,701 E | 5/2002 | Bahar et al. | |
| 6,387,964 B1 | 5/2002 | D'Agostino et al. | |

(Continued)

FOREIGN PATENT DOCUMENTS

| | | |
|---|---|---|
| DE | 26 24 203 | 12/1976 |
| DE | 26 38 791 | 3/1977 |
| DE | 100 21 104 A1 | 11/2001 |
| EP | 0 048 964 A2 | 4/1982 |
| EP | 0 407 937 A1 | 1/1991 |

(Continued)

OTHER PUBLICATIONS

Kirk-Othmer, *Encyclopedia of Chemical Technology*, 3d ed., vol. 10, (1980), pp. 840-855.
Gab-Hin Hwang et al.; "Preparation of Cation Exchange Membrane as a Separator for the All-Vanadium Redox Flow Battery", Journal of Membrane Science, Elsevier Scientific Publ. Company, Amsterdam, NL, vol. 120, No. 1, Oct. 30, 1996, pp. 55-67.

*Primary Examiner*—Peter D. Mulcahy
*Assistant Examiner*—Henry Hu
(74) *Attorney, Agent, or Firm*—Philip Y. Dahl

(57) ABSTRACT

A method is provided for obtaining crosslinked polymers having pendent sulfonic acid groups by crosslinking through the sulfonic acid groups or their precursors with aromatic crosslinkers or aromatic pendent crosslinking groups to form aromatic sulfones. Such crosslinked polymers may be used to make polymer electrolyte membranes (PEM's) that may be used in electrolytic cells such as fuel cells.

14 Claims, No Drawings

U.S. PATENT DOCUMENTS

| | | |
|---|---|---|
| 6,423,784 B1 | 7/2002 | Hamrock et al. |
| 6,426,397 B1 | 7/2002 | Armand et al. |
| 6,462,228 B1 | 10/2002 | Dams |
| 6,498,216 B1 | 12/2002 | Cheng |
| 6,503,378 B1 | 1/2003 | Fisher |
| 6,552,135 B2 | 4/2003 | Schnurnberger et al. |
| 6,624,328 B1 | 9/2003 | Guerra |
| 6,649,703 B2 | 11/2003 | Michot et al. |
| 6,667,377 B2 | 12/2003 | Feiring et al. |
| 6,670,424 B1 | 12/2003 | Michot et al. |
| 6,727,386 B2 * | 4/2004 | Hamrock .................. 564/82 |
| 6,872,781 B2 * | 3/2005 | Hedhli et al. ............... 525/191 |
| 2002/0014405 A1 | 2/2002 | Arcella et al. |
| 2002/0040106 A1 | 4/2002 | Wlassics et al. |
| 2003/0032739 A1 * | 2/2003 | Kerres et al. ............... 525/535 |
| 2003/0092940 A1 * | 5/2003 | Hamrock .................. 564/84 |
| 2003/0181572 A1 | 9/2003 | Tan et al. |
| 2003/0181615 A1 | 9/2003 | Ameduri et al. |
| 2003/0208014 A1 | 11/2003 | Kerres et al. |
| 2004/0121210 A1 | 6/2004 | Hamrock et al. |
| 2004/0241518 A1 | 12/2004 | Yang |
| 2005/0096442 A1 | 5/2005 | Thaler et al. |
| 2005/0107488 A1 | 5/2005 | Yandrasits et al. |
| 2005/0107489 A1 | 5/2005 | Yandrasits et al. |
| 2005/0107490 A1 | 5/2005 | Yandrasits et al. |
| 2005/0107532 A1 | 5/2005 | Guerra et al. |
| 2005/0113528 A1 | 5/2005 | Jing et al. |
| 2005/0131096 A1 | 6/2005 | Jing et al. |
| 2005/0131097 A1 | 6/2005 | Jing et al. |
| 2005/0137351 A1 | 6/2005 | Guerra |

FOREIGN PATENT DOCUMENTS

| | | | |
|---|---|---|---|
| EP | 0 567 879 A2 | | 11/1993 |
| EP | 0 422 231 B1 | | 12/1995 |
| EP | 1 085 038 A1 | | 3/2001 |
| EP | 1 091 435 A1 | | 4/2001 |
| EP | 1 179 548 A1 | | 2/2002 |
| EP | 1 238 999 A1 | | 9/2002 |
| EP | 1 359 142 A1 | | 11/2003 |
| FR | 2 387 260 | | 12/1976 |
| GB | 1184321 | | 3/1970 |
| JP | 53-29291 | | 3/1978 |
| JP | 53-97988 | | 8/1978 |
| JP | 53-134088 | | 11/1978 |
| JP | 54-52690 | | 4/1979 |
| JP | 56-72002 | | 6/1981 |
| JP | 60-250009 | | 12/1985 |
| JP | 61-060712 | | 3/1986 |
| JP | 62-288617 | | 12/1987 |
| JP | 64-3140 | | 1/1989 |
| JP | 5-314960 | | 11/1993 |
| JP | 6-016842 | | 1/1994 |
| JP | 8-239494 | | 9/1996 |
| JP | 2000-119420 | | 4/2000 |
| JP | 2000-268834 | | 9/2000 |
| JP | 2001-29800 | | 2/2001 |
| JP | 2001-176524 | | 6/2001 |
| JP | 2001-354641 | | 12/2001 |
| JP | 2002-003466 | | 1/2002 |
| JP | 2002-313364 | | 10/2002 |
| JP | 2003-342328 | | 12/2003 |
| WO | WO 94/03503 | | 2/1994 |
| WO | WO 97/17381 | | 5/1997 |
| WO | WO 99/38897 | | 8/1999 |
| WO | WO 00/52060 | | 9/2000 |
| WO | WO 01/27167 | A1 | 4/2001 |
| WO | WO 01/87992 | A2 | 11/2001 |
| WO | WO 01/96268 | A2 | 12/2001 |
| WO | WO 02/50142 | A1 | 6/2002 |
| WO | WO 02/062749 | A1 | 8/2002 |
| WO | WO 02/087001 | A2 | 10/2002 |
| WO | WO 02/103834 | A1 | 12/2002 |
| WO | WO 03/004463 | A1 | 1/2003 |
| WO | WO 03/022892 | A1 | 3/2003 |

* cited by examiner

POLYMER ELECTROLYTE WITH AROMATIC SULFONE CROSSLINKING

CROSS REFERENCE TO RELATED APPLICATION

This application is a divisional of U.S. Ser. No. 10/720,906, filed Nov. 24, 2003, now U.S. Pat. No. 7,060,756, the disclosure of which is herein incorporated by reference.

FIELD OF THE INVENTION

This invention relates to a method of obtaining crosslinked polymers having pendent sulfonic acid groups by crosslinking through the sulfonic acid groups or their precursors with aromatic crosslinkers or aromatic pendent crosslinking groups to form aromatic sulfones. Such crosslinked polymers may be used to make polymer electrolyte membranes (PEM's) that may be used in electrolytic cells such as fuel cells.

BACKGROUND OF THE INVENTION

Copolymers of tetrafluoroethylene (TFE) and a co-monomer according to the formula: $FSO_2-CF_2-CF_2-O-CF(CF_3)-CF_2-O-CF=CF_2$ are known and sold in sulfonic acid form, i.e., with the $FSO_2-$ end group hydrolyzed to $HSO_3-$, under the trade name Nafion® by DuPont Chemical Company, Wilmington, Del. Nafion® is commonly used in making polymer electrolyte membranes for use in fuel cells.

Copolymers of tetrafluoroethylene (TFE) and a co-monomer according to the formula: $FSO_2-CF_2-CF_2-O-CF=CF_2$ are known and used in sulfonic acid form, i.e., with the $FSO_2-$ end group hydrolyzed to $HSO_3-$, in making polymer electrolyte membranes for use in fuel cells.

U.S. patent application Ser. No. 10/325,278, filed Dec. 19, 2002, the disclosure of which is incorporated herein by reference, discloses a polymer electrolyte membrane having a thickness of 90 microns or less and comprising a polymer, said polymer comprising a highly fluorinated backbone and recurring pendant groups according to the formula:

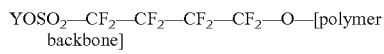

where Y is $H^+$ or a monovalent cation such as an alkali metal cation. Typically, the membrane is a cast membrane. Typically, the polymer has a hydration product of greater than 22,000. Typically, the polymer has an equivalent weight of 800-1200.

International Patent Application Publication No. WO 01/27167 purportedly discloses a crosslinked fluorocarbon polymeric composition having hydrophilic functional groups which is crosslinked with fluorinated crosslinking groups.

U.S. Patent Application Publication No. 2003/0032739 discloses a covalently crosslinked polymer or polymer membrane consisting of one or more polymers, which may bear precursors of cation exchange groups, which are crosslinked through the reaction of sulfinate groups $-SO_2Me$ on the polymer with crosslinkers which may include halo aromatics to form cross-linking bridges which may include: polymer-$SO_2$-arylene-$SO_2$-polymer.

U.S. Pat. No. 6,090,895 discloses a method for making crosslinked acidic polymers useful as ion conductive membranes, such as crosslinked sulfonated polyether ketones, sulfonated polysulfones, sulfonated polystyrenes, and other acidic polymers, by crosslinking with a species which generates an acidic functionality. The crosslinker preferably binds to acid functions by conversion of acid groups to imide functionality, which, due to the acidity of the N—H bonds therein, compensate for the acidity lost by the occupation of the acid groups and thus preserve membrane conductivity while contributing to membrane strength and resistance to swelling.

U.S. Patent Application Publication No. 2003/0092940 discloses a method for making aromatic-imide and aromatic-methylidynetrissulfonyl species by reaction of aromatic species with a reactant according to the formula:

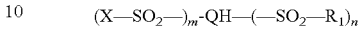

wherein Q is C or N; wherein each X is independently selected from the group consisting of halogens, typically F or Cl; wherein each $R_1$ is independently selected from the group consisting of aliphatic and aromatic groups, which may or may not be straight-chain, branched, cyclic, heteroatomic, polymeric, halogenated, fluorinated or substituted; wherein m is greater than 0; wherein m+n=2 when Q is N; and wherein m+n=3 when Q is C. Ar may be derived from an aromatic polymeric compound. In addition, the reference discloses compounds according to the formula: $(Ar-SO_2-)_m-QH-(-SO_2-R_1)_n$ wherein $R_1$ comprises a highly acidic group selected from sulfonic acid, carboxylic acid and phosphonic acid, and Ar is derived from an aromatic compound.

SUMMARY OF THE INVENTION

The present invention provides crosslinked polymers and method of making crosslinked polymers by a comprising the steps of: a) providing a highly fluorinated polymer comprising pendent groups which include a group according to the formula $-SO_2X$, wherein each X is independently selected from F, Cl, Br, I, $-OH$ or $-O-SO_2R^2$ wherein $R^2$ is an aliphatic group containing 1-18 carbon atoms which may be substituted; and b) reacting the polymer with a crosslinking agent according to the formula $Ar_nR^1$, wherein each Ar is selected independently from aromatic groups containing 6-24 carbon or nitrogen atoms and wherein each Ar may be substituted, wherein $R^1$ is a direct bond or an aromatic or aliphatic linking group, wherein $R^1$ may be straight-chain, branched, cyclic, heteroatomic, polymeric, halogenated, fluorinated or substituted, and where n is at least 2, to form crosslinks comprising units according to the formula $(-SO_2Ar)_nR^1$. In one embodiment, the polymer comprises pendent groups that include $-SO_2F$ and at least a portion of the $-SO_2F$ groups are then converted to $-SO_2Cl$ or $-SO_2-O-SO_2R^2$ for reaction. In one embodiment, the polymer is formed into a membrane prior to crosslinking, typically one having a thickness of 90 microns or less. Typically, the remaining $-SO_2X$ groups are converted to sulfonic acid groups after crosslinking.

In another aspect, the present invention provides a highly fluorinated crosslinked polymer comprising: a backbone, pendent groups which comprise sulfonic acid groups, and crosslinks comprising units according to the formula $(-SO_2Ar)_nR^1$ wherein each Ar is selected independently from aromatic groups containing 6-24 carbon or nitrogen atoms and wherein each Ar may be substituted, wherein $R^1$ is a direct bond or an aromatic or aliphatic linking group, wherein R may be straight-chain, branched, cyclic, heteroatomic, polymeric, halogenated, fluorinated or substituted, and where n is at least 2. In one embodiment, the polymer is a polymer electrolyte membrane, typically having a thickness of 90 microns or less. Typical pendent groups include groups according to the formula $-O-(CF_2)_4-SO_3H$ and groups according to the formula $-O-CF_2-CF(CF_3)-O-CF_2-CF_2-SO_3H$.

In another aspect, the present invention provides a method of making a crosslinked polymer comprising the steps of: a) providing a highly fluorinated polymer comprising first pendent groups which include a group according to the formula —$SO_2X$, wherein each X is independently selected from F, Cl, Br, I, —OH or —O—$SO_2R^2$ wherein $R^2$ is an aliphatic group containing 1-18 carbon atoms which may be substituted, and second pendent groups which include groups —Ar, wherein each Ar is selected independently from aromatic groups containing 6-24 carbon or nitrogen atoms and wherein each Ar may be substituted; and b) reacting the polymer to form crosslinks between the first and second pendent groups comprising units according to the formula —$SO_2Ar$—. In one embodiment, the polymer comprises first pendent groups that include —$SO_2F$ and at least a portion of the —$SO_2F$ groups are then converted to —$SO_2Cl$ or —$SO_2$—O—$SO_2R^2$ for reaction. In one embodiment, the polymer is formed into a membrane prior to crosslinking, typically one having a thickness of 90 microns or less. Typically, the remaining —$SO_2X$ groups are converted to sulfonic acid groups after crosslinking.

In another aspect, the present invention provides a highly fluorinated crosslinked polymer comprising: a backbone, pendent groups which comprise sulfonic acid groups, and crosslinks comprising units according to the formula —$SO_2Ar$— wherein each Ar is selected independently from aromatic groups containing 6-24 carbon or nitrogen atoms and wherein each Ar may be substituted. In one embodiment, the polymer is a polymer electrolyte membrane, typically having a thickness of 90 microns or less. Typical pendent groups include groups according to the formula —O—$(CF_2)_4$—$SO_3H$ and groups according to the formula —O—$CF_2$—$CF(CF_3)$—O—$CF_2$—$CF_2$—$SO_3H$.

In this application:

"equivalent weight" (EW) of a polymer means the weight of polymer which will neutralize one equivalent of base;

"hydration product" (HP) of a polymer means the number of equivalents (moles) of water absorbed by a membrane per equivalent of sulfonic acid groups present in the membrane multiplied by the equivalent weight of the polymer; and "highly fluorinated" means containing fluorine in an amount of 40 wt % or more, typically 50 wt % or more and more typically 60 wt % or more; and "substituted" means, for a chemical species, substituted by conventional substituents which do not interfere with the desired product or process, e.g., substituents can be alkyl, alkoxy, aryl, phenyl, halo (F, Cl, Br, I), cyano, nitro, etc.

DETAILED DESCRIPTION

Briefly, the present invention provides a method of obtaining crosslinked polymers having pendent sulfonic acid groups by crosslinking through the sulfonic acid groups or their precursors with aromatic crosslinkers or aromatic pendent crosslinking groups to form aromatic sulfones. Such crosslinked polymers may be used to make polymer electrolyte membranes (PEM's) that may be used in electrolytic cells such as fuel cells.

PEM's manufactured from the crosslinked polymer according to the present invention may be used in the fabrication of membrane electrode assemblies (MEA's) for use in fuel cells. An MEA is the central element of a proton exchange membrane fuel cell, such as a hydrogen fuel cell. Fuel cells are electrochemical cells which produce usable electricity by the catalyzed combination of a fuel such as hydrogen and an oxidant such as oxygen. Typical MEA's comprise a polymer electrolyte membrane (PEM) (also known as an ion conductive membrane (ICM)), which functions as a solid electrolyte. One face of the PEM is in contact with an anode electrode layer and the opposite face is in contact with a cathode electrode layer. Each electrode layer includes electrochemical catalysts, typically including platinum metal. Gas diffusion layers (GDL's) facilitate gas transport to and from the anode and cathode electrode materials and conduct electrical current. The GDL may also be called a fluid transport layer (FTL) or a diffuser/current collector (DCC). The anode and cathode electrode layers may be applied to GDL's in the form of a catalyst ink, and the resulting coated GDL's sandwiched with a PEM to form a five-layer MEA. Alternately, the anode and cathode electrode layers may be applied to opposite sides of the PEM in the form of a catalyst ink, and the resulting catalyst-coated membrane (CCM) sandwiched with two GDL's to form a five-layer MEA. The five layers of a five-layer MEA are, in order: anode GDL, anode electrode layer, PEM, cathode electrode layer, and cathode GDL. In a typical PEM fuel cell, protons are formed at the anode via hydrogen oxidation and transported across the PEM to the cathode to react with oxygen, causing electrical current to flow in an external circuit connecting the electrodes. The PEM forms a durable, non-porous, electrically non-conductive mechanical barrier between the reactant gases, yet it also passes $H^+$ ions readily.

The polymer to be crosslinked comprises a backbone, which may be branched or unbranched but is typically unbranched. The backbone is fluorinated, typically highly fluorinated, and more typically perfluorinated. The backbone may comprise units derived from tetrafluoroethylene (TFE), i.e., typically —$CF_2$—$CF_2$— units, and units derived from co-monomers, typically including at least one according to the formula $CF_2$=CY—$R^{10}$ where Y is typically F but may also be $CF_3$, and where $R^{10}$ is a first pendent group which includes a group according to the formula —$SO_2X$ wherein X is selected from F, Cl, Br, I, —OH or —O—$SO_2R^2$ wherein $R^2$ is an aliphatic group containing 1-18 carbon atoms which may be substituted. Where —$SO_2X$ is a sulfonyl halide, X is most typically F. In an alternative embodiment, first pendent groups $R^{10}$ may be added to the backbone by grafting. Typically, first pendent groups $R^{10}$ are highly fluorinated and more typically perfluorinated. $R^{10}$ may be aromatic or non-aromatic. Typically, $R^{10}$ is —$R^{11}$—$SO_2X$, where $R^{11}$ is a branched or unbranched perfluoroalkyl or perfluoroether group comprising 1-15 carbon atoms and 0-4 oxygen atoms. $R^{11}$ is typically —O—$R^{12}$— wherein $R^{12}$ is a branched or unbranched perfluoroalkyl or perfluoroether group comprising 1-15 carbon atoms and 0-4 oxygen atoms. $R^{11}$ is more typically —O—$R^{13}$— wherein $R^{13}$ is a perfluoroalkyl group comprising 1-15 carbon atoms. Examples of $R^{11}$ include:

—$(CF_2)_n$— where n is 1, 2, 3, 4, 5, 6, 7, 8, 9, 10, 11, 12, 13, 14 or 15

(—$CF_2CF(CF_3)$—$)_n$ where n is 1, 2, 3, 4, or 5

(—$CF(CF_3)CF_2$—$)_n$ where n is 1, 2, 3, 4, or 5(—$CF_2CF(CF_3)$—$)_n$—$CF_2$— where n is 1, 2, 3 or 4

(—O—$CF_2CF_2$—$)_n$ where n is 1, 2, 3, 4, 5, 6 or 7

(—O—$CF_2CF_2CF_2$—$)_n$ where n is 1, 2, 3, 4, or 5

(—O—$CF_2CF_2CF_2CF_2$—$)_n$ where n is 1, 2 or 3

(—O—$CF_2CF(CF_3)$—$)_n$ where n is 1, 2, 3, 4, or 5

(—O—$CF_2CF(CF_2CF_3)$—$)_n$ where n is 1, 2 or 3

(—O—$CF(CF_3)CF_2$—$)_n$ where n is 1, 2, 3, 4 or 5

(—O—$CF(CF_2CF_3)CF_2$—$)_n$ where n is 1, 2 or 3

(—O—$CF_2CF(CF_3)$—$)_n$—O—$CF_2CF_2$— where n is 1, 2, 3 or 4

(—O—$CF_2CF(CF_2CF_3)$—$)_n$—O—$CF_2CF_2$— where n is 1, 2 or 3

(—O—CF(CF$_3$)CF$_2$—)$_n$—O—CF$_2$CF$_2$— where n is 1, 2, 3 or 4

(—O—CF(CF$_2$CF$_3$)CF$_2$—)$_n$—O—CF$_2$CF$_2$— where n is 1, 2 or 3

—O—(CF$_2$)$_n$— where n is 1, 2, 3, 4, 5, 6, 7, 8, 9, 10, 11, 12, 13 or 14

R$^{10}$ is typically —O—CF$_2$CF$_2$CF$_2$CF$_2$—SO$_2$X or —O—CF$_2$—CF(CF$_3$)—O—CF$_2$—CF$_2$—SO$_2$X and most typically —O—CF$_2$CF$_2$CF$_2$CF$_2$—SO$_2$X. The —SO$_2$X group is most typically —SO$_2$F during polymerization, i.e., X is F. The —SO$_2$X group is typically converted to —SO$_3$H at some point prior to use of the fluoropolymer as an polymer electrolyte. The fluoromonomer providing first side group R$^{10}$ may be synthesized by any suitable means, including methods disclosed in U.S. Pat. No. 6,624,328.

The polymer may be made by any suitable method, including emulsion polymerization, extrusion polymerization, polymerization in supercritical carbon dioxide, solution or suspension polymerization, and the like, including methods disclosed in U.S. patent application Ser. No. 10/697,768, filed Oct. 30, 2003 and references cited therein.

Where the —SO$_2$X group is —SO$_2$F during polymerization, some of the —SO$_2$F groups may be converted to more reactive groups prior to crosslinking, such as —SO$_2$Cl, —SO$_2$Br, —SO$_2$I or —O—SO$_2$R$^2$ wherein R$^2$ is an aliphatic group containing 1-18 carbon atoms which may be substituted, more typically containing 1-8 carbon atoms, and most typically methyl or ethyl. Typically, between 1 and 50% of —SO$_2$F groups are converted to more reactive groups. —SO$_2$F groups may be converted by any suitable method. —SO$_2$F groups may be converted to —SO$_2$Cl groups by any suitable method. In one such method, —SO$_2$F groups are reduced to —SO$_2$H by use of a suitable reducing agent, such as a hydrazine or mercaptan such as mercaptoethanol, and subsequently converted to —SO$_2$Cl with a hypochloride. In another such method, —SO$_2$F groups may be converted to —SO$_2$Cl groups by reaction with oxalyl chloride in dry toluene with pyridine catalyst. —SO$_2$F groups may be converted to —O—SO$_2$R$^2$ groups by any suitable method. In one such method, —SO$_2$F groups are converted by exchange with R$^2$—SO$_2$—O—SO$_2$R$^2$, e.g. CH$_3$—SO$_2$—O—SO$_2$—CH$_3$. In another such method, —SO$_2$F groups are converted by reaction with R$^2$—SO$_3$H and P$_2$O$_5$.

In one embodiment of the present invention, the polymer additionally comprises second pendent groups which include groups —Ar, wherein each Ar is selected independently from aromatic groups containing 6-24 carbon or nitrogen atoms and wherein each Ar may be substituted. Typical Ar groups include phenyl, naphthyl, anthracyl, phenanthracyl, biphenyl, terphenyl, fluoryl, indyl, fluoranthyl, pyridyl, puryl and the like. When substituents are present, they are typically electron donating substituents, such as alkoxy, hydroxy, amine, alkyl and the like. The second pendent groups may be introduced into the polymer by ter-polymerization with monomers such as CF$_2$=CY—R$^{20}$ where Y is typically F but may also be CF$_3$, and where R$^{20}$ is the second pendant group. In an alternative embodiment, first pendant groups R$^{20}$ may be added to the backbone by grafting. Second pendent groups R$^{20}$ may be according to the formula —R$^{11}$—Ar, where R$^{11}$ is as described above. In this embodiment of the invention, the polymer is crosslinked by joining first and second pendent groups. Additional crosslinking agent, described below, may be added but is unnecessary. The second pendent groups are present in the polymer in a numerical (molar) amount that is less than the amount of the first pendent groups, typically less than 90% relative to the amount of the first pendent groups and more typically less than 50%.

In one embodiment of the present invention, the polymer is crosslinked by reaction with a crosslinking agent according to the formula Ar$_n$R$^1$, wherein Ar is as described above, wherein R$^1$ is a direct bond or an aromatic or aliphatic linking group, wherein R$^1$ may be straight-chain, branched, cyclic, heteroatomic, polymeric, halogenated, fluorinated or substituted, and where n is at least 2. n is typically 2-4, more typically 2-3, and most typically 2. R$^1$ typically contains 1-120 carbon, oxygen or nitrogen atoms, but may be larger if it is polymeric. R$^1$ is typically aliphatic. R$^1$ is more typically a straight-chain or branched alkylene, alkoxy or polyether group containing 1-20 carbon or oxygen atoms. R$^1$ may also be a polymer or oligomer, especially where n is a larger number, e.g. greater than four. R$^1$ is typically fluorinated, more typically highly fluorinated, and most typically perfluorinated. Where R$^1$ is a direct bond, n must be 2 and the crosslinking agent is Ar—Ar, e.g., biphenyl. Typically, R$^1$ attaches to each Ar through an oxygen atom. Typically R$^1$ is —O—R$^3$—O—, where R$^3$ is an aliphatic linking group containing 1-18 carbon or oxygen atoms, more typically containing 1-8 carbon or oxygen atoms. Examples of crosslinking agents according to the present invention include: diphenyl ether, diphenoxy alkanes, diphenoxy ethers, diphenoxy polyethers, and the like.

The crosslinking agent and polymer may be mixed by any suitable method, including mixing in solution or suspension, kneading, milling, or the like. The amount of crosslinking agent mixed with the polymer is typically selected so that the resulting crosslinked polymer will meet the hydration product and equivalent weight parameters described below.

In one embodiment of the present invention, the polymer or polymer/crosslinking agent blend is formed into a membrane prior to crosslinking. Any suitable method of forming the membrane may be used. The polymer is typically cast from a suspension. Any suitable casting method may be used, including bar coating, spray coating, slit coating, brush coating, and the like. Alternately, the membrane may be formed from neat polymer in a melt process such as extrusion. After forming, the membrane may be annealed. Typically the membrane has a thickness of 90 microns or less, more typically 60 microns or less, and most typically 30 microns or less. A thinner membrane may provide less resistance to the passage of ions. In fuel cell use, this results in cooler operation and greater output of usable energy. Thinner membranes must be made of materials that maintain their structural integrity in use.

The crosslinking reaction may be carried out by any suitable method. Typically, the reaction is accomplished by application of heat, typically to a temperature of 160° C. or more. Typically, a catalyst such as a Lewis acid is introduced. The step of crosslinking the polymer may occur in whole or part during annealing of the membrane or may be carried out separate from any annealing step. During the crosslinking step, aromatic sulfone groups are formed according to the formula: —SO$_2$Ar—. Where a crosslinking agent is used, the resulting crosslinks comprise units according to the formula (—SO$_2$Ar)$_n$R$^1$. Where first and second pendent groups join to form crosslinks, they comprise units according to the formula —SO$_2$Ar—.

After crosslinking, the remaining sulfur-containing functions of the pendant groups may be converted to sulfonic acid form by any suitable process. Sulfonyl halide groups may be converted by hydrolysis. In one typical process, the polymer is immersed in an aqueous solution of a strong base and subsequently acidified. In one typical embodiment, a polymer membrane is immersed in 15% KOH in water at 80° C. for 1 hour, then washed twice in 20% nitric acid at 80° C., then boiled in deionized water twice. Sulfonyl anhydride groups may be converted by hydrolysis, with removal of remaining $R^2$—$SO_3H$.

The acid-functional pendant groups typically are present in an amount sufficient to result in an hydration product (HP) of greater than 15,000, more typically greater than 18,000, more typically greater than 22,000, and most typically greater than 25,000. In general, higher HP correlates with higher ionic conductance.

The acid-functional pendant groups typically are present in an amount sufficient to result in an equivalent weight (EW) of less than 1200, more typically less than 1100, and more typically less than 1000, and more typically less than 900.

In a further embodiment, the polymer or polymer/crosslinking agent blend may be imbibed into a porous supporting matrix prior to crosslinking, typically in the form of a thin membrane having a thickness of 90 microns or less, more typically 60 microns or less, and most typically 30 microns or less. Any suitable method of imbibing the polymer into the pores of the supporting matrix may be used, including overpressure, vacuum, wicking, immersion, and the like. The polymer becomes embedded in the matrix upon reaction of the amidine groups. Any suitable supporting matrix may be used. Typically the supporting matrix is electrically non-conductive. Typically, the supporting matrix is composed of a fluoropolymer, which is more typically perfluorinated. Typical matrices include porous polytetrafluoroethylene (PTFE), such as biaxially stretched PTFE webs.

It will be understood that membranes made according to the method of the present invention may differ in chemical structure from those made by other methods, in the structure of crosslinks, the placement of crosslinks, the placement of acid-functional groups, and the like.

This invention is useful in the manufacture of polymer electrolyte membranes for use in electrolytic cells such as fuel cells.

Various modifications and alterations of this invention will become apparent to those skilled in the art without departing from the scope and principles of this invention, and it should be understood that this invention is not to be unduly limited to the illustrative embodiments set forth hereinabove.

We claim:

1. A method of making a crosslinked polymer comprising the steps of:
    a) providing a highly fluorinated polymer comprising pendent groups which include a group according to the formula —$SO_2X$, wherein each X is independently selected from F, Cl, Br, I, —OH or —O—$SO_2R^2$ wherein $R^2$ is an aliphatic group containing 1-18 carbon atoms which may be substituted; and
    b) reacting said polymer with a crosslinking agent according to the formula $Ar_nR^1$, wherein each Ar is selected independently from aromatic groups containing 6-24 carbon or nitrogen atoms and wherein each Ar may be substituted, wherein $R^1$ is a direct bond or an aromatic or aliphatic linking group, wherein $R^1$ may be straight-chain, branched, cyclic, heteroatomic, polymeric, halogenated, fluorinated or substituted, and where n is at least 2, to form crosslinks comprising units according to the formula (—$SO_2Ar)_nR^1$.

2. The method according to claim 1 wherein said method additionally comprises, prior to said step b), the step of
    c) forming said polymer into a membrane.

3. The method according to claim 2 wherein step c) comprises imbibing said mixture into a porous supporting matrix.

4. The method according to claim 3 wherein said porous supporting matrix is a porous polytetrafluoroethylene web.

5. The method according to claim 2 wherein said membrane has a thickness of 90 microns or less.

6. The method according to claim 1 wherein said method additionally comprises, after said step b), the step of:
    d) converting any remaining groups according to the formula —$SO_2X$ to sulfonic acid groups.

7. The method according to claim 1 wherein each Ar is a phenyl group which may be substituted.

8. The method according to claim 1 wherein one or more Ar is substituted with an electron donating group.

9. The method according to claim 1 wherein one or more Ar is substituted with an alkoxy group.

10. The method according to claim 1 wherein $R^1$ is an aliphatic linking group containing 1-20 carbon or oxygen atoms.

11. The method according to claim 1 wherein n is 2.

12. The method according to claim 1 wherein each X is independently selected from F or Cl.

13. The method according to claim 1 wherein said pendent groups are according to the formula —O—$(CF_2)_4$—$SO_2X$.

14. The method according to claim 1 wherein said pendent groups are according to the formula —O—$CF_2$—$CF(CF_3)$—O—$CF_2$—$CF_2$—$SO_2X$.

* * * * *

UNITED STATES PATENT AND TRADEMARK OFFICE
CERTIFICATE OF CORRECTION

PATENT NO. : 7,847,035 B2  Page 1 of 1
APPLICATION NO. : 11/278459
DATED : December 7, 2010
INVENTOR(S) : Naiyong Jing It is certified that error appears in the above-identified patent and that said Letters Patent is hereby corrected as shown below:

Title Page
Item [56], References Cited, OTHER PUBLICATIONS
    delete "Gab-Hin" and insert --Gab-Jin-- therefor.

Column 5
Line 21; after "2003"
    insert --[Attorney Docket No. 58585US002]-- therefor.

Column 8
Claim 2, Line 16, delete "step of"
    and insert -- step of: -- therefor.

Signed and Sealed this
Fifteenth Day of March, 2011

David J. Kappos
*Director of the United States Patent and Trademark Office*